United States Patent
Moore, Jr.

(10) Patent No.: US 11,224,776 B2
(45) Date of Patent: Jan. 18, 2022

(54) INLINE VALVE FOR SPRINKLER HEAD REPLACEMENT

(71) Applicant: Fred D. Moore, Jr., Collegeville, PA (US)

(72) Inventor: Fred D. Moore, Jr., Collegeville, PA (US)

(73) Assignee: SPRINKLER STOP, LLC, Pompano Beach, CA (US)

( * ) Notice: Subject to any disclaimer, the term of this patent is extended or adjusted under 35 U.S.C. 154(b) by 0 days.

(21) Appl. No.: 17/097,528

(22) Filed: Nov. 13, 2020

(65) Prior Publication Data
US 2021/0154505 A1 May 27, 2021

Related U.S. Application Data

(60) Provisional application No. 62/939,751, filed on Nov. 25, 2019.

(51) Int. Cl.
*A62C 35/68* (2006.01)
*F16K 3/26* (2006.01)

(52) U.S. Cl.
CPC .............. *A62C 35/68* (2013.01); *F16K 3/262* (2013.01)

(58) Field of Classification Search
CPC ........... A62C 35/68; F16L 37/42; F16L 37/46
See application file for complete search history.

(56) References Cited

U.S. PATENT DOCUMENTS

| | | | | |
|---|---|---|---|---|
| 951,519 A * | 3/1910 | Bacigalupi | ............ | F16L 37/252 137/322 |
| 2,739,612 A * | 3/1956 | Hansen | ............. | F16K 31/50 137/614.05 |
| 4,331,177 A * | 5/1982 | Makishima | ............. | F16L 37/42 137/556 |
| 5,577,706 A * | 11/1996 | King | ............. | F16L 29/02 251/149.1 |
| 6,024,175 A * | 2/2000 | Moore, Jr. | ............. | A62C 37/20 169/37 |
| 6,536,534 B1 * | 3/2003 | Sundholm | ............. | A62C 35/68 169/37 |
| 2006/0289823 A1 * | 12/2006 | Arosio | ................ | A62C 35/68 251/149.4 |
| 2016/0341319 A1 * | 11/2016 | Palle | ...................... | F16K 1/126 |

FOREIGN PATENT DOCUMENTS

FR 2677427 A1 * 12/1992 .......... F16L 37/0841

* cited by examiner

*Primary Examiner* — Kenneth Rinehart
*Assistant Examiner* — Nicole Gardner
(74) *Attorney, Agent, or Firm* — Barlow, Josephs & Hollmes, Ltd.

(57) ABSTRACT

A terminal fixture is provided for installation at the end of each sprinkler head drop in a fire protection system. The terminal fixture is an automatic valve device that operates in response to the installation or removal of a sprinkler head from the fixture itself. When the sprinkler head is removed the terminal valve operates to close the end of the sprinkler drop feed line to prevent flow of fire protection fluid by preventing an open system. When a sprinkler head is reinstalled into the valve, the valve plunger is automatically displaced to an open position to restore full and unobstructed flow to the sprinkler head returning the drop to full and operable status. In this manner, no manual valves are added to the system which would prevent failsafe operation thereof.

9 Claims, 4 Drawing Sheets

INLINE VALVE FOR SPRINKLER HEAD REPLACEMENT

CROSS-REFERENCE TO RELATED APPLICATIONS

This application is related to and claims priority from earlier filed U.S. Provisional Patent Application No. 62/939,751, filed Nov. 25, 2019.

BACKGROUND OF THE INVENTION

The present invention relates to an automated valve stop for installation in fire protection sprinkler systems. More specifically, the present invention relates to a valve for installation at the terminal ends of fire protection sprinkler lines just prior to the sprinkler head itself wherein the sprinkler line is automatically sealed to prevent flow of fluid from the system when the sprinkler head is removed, yet allows full flow when a sprinkler head is installed.

Fire protection sprinkler systems have now become very common as a means to protect buildings and other property from fire. Fire protection systems are often utilized in offices, warehouses, hotels, office buildings, and now are being utilized commonly in residences, particularly in cases of new construction. Given the widespread installation, it is not uncommon that a sprinkler head becomes damaged and needs to be removed and replaced due to leakage, to change the spray pattern, to change the temperature rating of for some other defect.

Prior to the present invention, the process of changing a sprinkler head or servicing the system required that the system be turned off and drained, thereby disabling the entire system. This leaves the structure unprotected for the duration of the service operation and complicates the scheduling of such service through the need to coordinate with fire departments and the requirement of posting fire watches. In addition, the service operation requires additional time in order to drain the system of fire protection fluid, which is usually water and/or a mixture with antifreeze under pressure, remove and replace the sprinkler head, and then recharge the system with appropriate fire-retardant fluid. This service operation usually requires several man hours to perform.

Accordingly, there is a need for a system that eliminates the need to drain and recharge a fire protection system with fire retardant fluid whenever a sprinkler head must be serviced while insuring no manual valves are introduced that could compromise system integrity. There is a further need for a system that provides an economical and effective solution for the problem of having to drain and recharge the fire protection system without introducing manual valves that are not permitted in such systems. There is a further need for a system that provides an economical and effective solution for the problem of having to drain and recharge the fire protection system when servicing sprinkler heads that does not require any significant change in layout or dimensions of the fire protection sprinkler system while also preventing the introduction of manual valves that would compromise the failsafe operation of the system.

BRIEF SUMMARY OF THE INVENTION

In view of the above noted servicing and maintenance issues, the present invention provides a terminal fixture for installation at the end of each sprinkler head drop in a fire protection system. The terminal fixture is an automatic valve device that operates in response to the installation or removal of a sprinkler head from the fixture itself. As will be described in detail below, when the sprinkler head is removed the terminal valve operates to close the end of the sprinkler drop feed line to prevent flow of fire protection fluid by preventing an open system. When a sprinkler head is reinstalled into the valve, the valve plunger is automatically displaced to an open position to restore full and unobstructed flow to the sprinkler head returning the drop to full and operable status. In this manner, no manual valves are added to the system which would prevent failsafe operation thereof.

The terminal fixture consists of an automatic valve. The valve comprises a valve body, an operable valve plunger within the valve body and a flow path defined within the valve body and the valve plunger. The valve body includes at least one connection point for the attachment of a feed line in the form of a sprinkler drop, at least one connection for the installation of a sprinkler head and may optionally include an access point that allows access to and servicing of the operable valve plunger within the valve body. The valve body may be formed of any materials known to those in the field of fire sprinklers including, but not limited to brass, cast iron, galvanized iron, galvanized steel, ductile iron, coper and/or CPVC. The two connection points are preferably threaded for connection with the feed piping and the sprinkler head. In the case of CPVC connections, the connection point for the feed pipe may be a glued-on slip joint for connection to the feed pipe using the appropriate CPVC adhesive system.

The valve plunger is slidably received within the valve body. Installation may be accomplished via one end of the valve body or via the access point wherein the access point is sealed after installation of the valve plunger. The valve plunger is preferably hollow and includes a valve port in one side thereof wherein a pair of sealing rings are installed on the valve plunger below the valve port. The valve plunger further includes a neck that extends upwardly into the sprinkler head connection and is hollow providing a flow channel as between the valve port and the sprinkler head. The valve plunger is preferably spring biased such that when a supply pipe is connected and no sprinkler head is installed the valve plunger resides in an upward, closed position with the valve port positioned in the upper portion of the valve body being sealed against flow by the two sealing rings. It is of note that the upper sealing ring prevents flow of fire protection to the sprinkler head in this position allowing removal and replacement of the sprinkler head while the lower sealing ring further prevents flow of fire protection fluid into the lower portion of the valve body as fluid in this location would become trapped interfering with operation of the valve plunger within the valve body.

When a sprinkler head is installed, the valve plunger is pressed into the valve body by the sprinkler head as it is threaded into the sprinkler head connection point. When fully installed, the sprinkler head depresses the valve plunger thereby positioning the valve port in alignment with the feed line. In this position, fire protection fluid is freely allowed to flow from the feed line to the sprinkler head.

Further, the valve plunger is preferably indexed within the valve body using an indexing pin, fin or the like, that aligns in a manner that prevents rotation as between the two components. A removable cap may be provided at the bottom of both the valve body and valve plunger to allow access and servicing as needed.

It is therefore an object of the present disclosure to provide an automated valve at the terminal end of a fire protection drop that eliminates the need to drain and recharge a fire protection system with fire retardant fluid whenever a sprinkler head must be serviced. It is a further object of the present disclosure to provide an economical and effective solution for the problem of having to drain and recharge the fire protection system without introducing manual valves that are not permitted in such systems. It is still a further object of the present disclosure to provide an economical and effective solution for the problem of having to drain and recharge the fire protection system when servicing sprinkler heads that does not require any significant change in layout or dimensions of the fire protection sprinkler system while also preventing the introduction of manual valves that would compromise the failsafe operation of the system.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
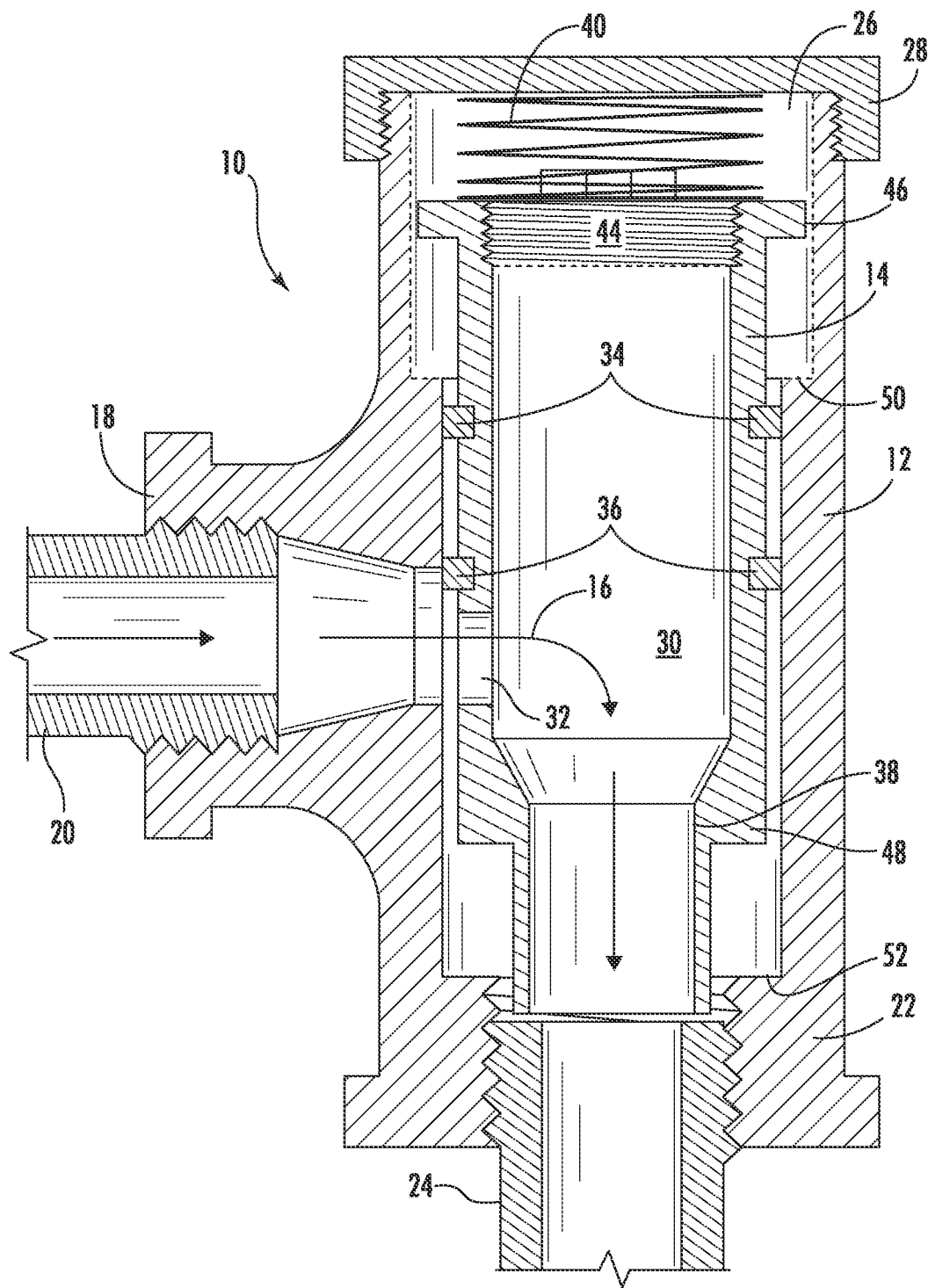
FIG. 1 is a cross-sectional view of an embodiment of the automatic terminal valve of the present invention, shown in the open position with a sprinkler head installed.

Now referring to the drawings, a terminal fixture in the form of an automated valve is disclosed for installation at the end of each sprinkler head drop in a fire protection system. As can be seen the principal component of the terminal fixture is an automatic valve device that operates in response to the installation or removal of a sprinkler head from the fixture itself. As will be described in detail below, when the sprinkler head is removed the terminal valve operates to close the end of the sprinkler drop feed line to prevent flow of fire protection fluid by preventing an open system. When a sprinkler head is reinstalled into the valve, the valve plunger is automatically displaced to an open position to restore full and unobstructed flow to the sprinkler head returning the drop to full and operable status. In this manner, no manual valves are added to the system which would prevent failsafe operation thereof.

Turning now to FIG. 1, the terminal fixture consists of an automatic valve 10. The automatic valve 10 comprises a valve body 12, an operable valve plunger 14 within the valve body and a flow path 16 defined within the valve body 12 and the valve plunger 14. The valve body 12 includes at least one connection point 18 for the attachment of a feed line 20 in the form of a sprinkler drop, at least one connection 22 for the installation of a sprinkler head 24 and may optionally include an access point 26, preferably sealed with a removable cap 28, that allows access to and servicing of the operable valve plunger 14 within the valve body 12. One skilled in the art will appreciate that there are many ways to facilitate such access and while these methods are not iterated herein they still fall within the scope of the present invention.

The valve body 12 and valve plunger 14 may be formed of any materials known to those in the field of fire sprinklers including, but not limited to brass, cast iron, galvanized iron, galvanized steel, ductile iron, copper and/or CPVC. The two connection points 18, 22 are preferably threaded for connection with the feed line 20 and the sprinkler head 24. In the case of CPVC connections, the connection point 18 for the feed line 20 may be a glued-on slip joint for connection to the feed line 20 using the appropriate CPVC adhesive system.

The valve plunger 14 is slidably received within the valve body 12. Installation of the valve plunger 14 may be accomplished via one end of the valve body 12 or via the access point 26 wherein the access point 26 is sealed with a cap 28 after installation of the valve plunger 14. While the cap 28 is preferably removable, one skilled in the art should appreciate that the sealing may also be made using semi-permanent of permanent connection means as well. The valve plunger 14 is preferably hollow 30 and includes a valve port 32 in one side thereof wherein a pair of sealing rings 34, 36 are installed on the valve plunger 14 above the valve port 32.

Figure 2:
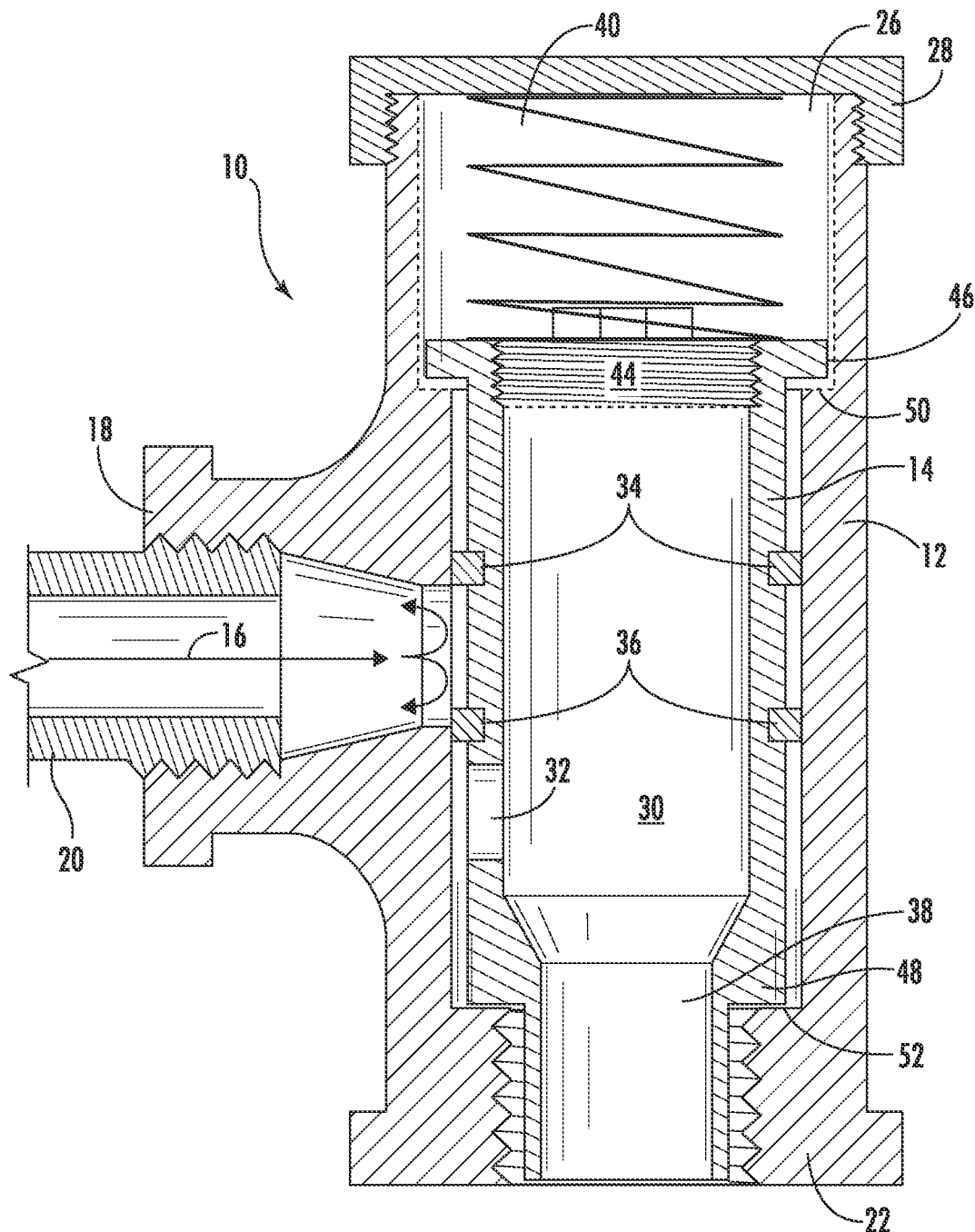
FIG. 2 is a cross-sectional view of and embodiment of the automatic terminal valve of the present invention, shown in the closed position with a sprinkler head removed.
Figure 3:
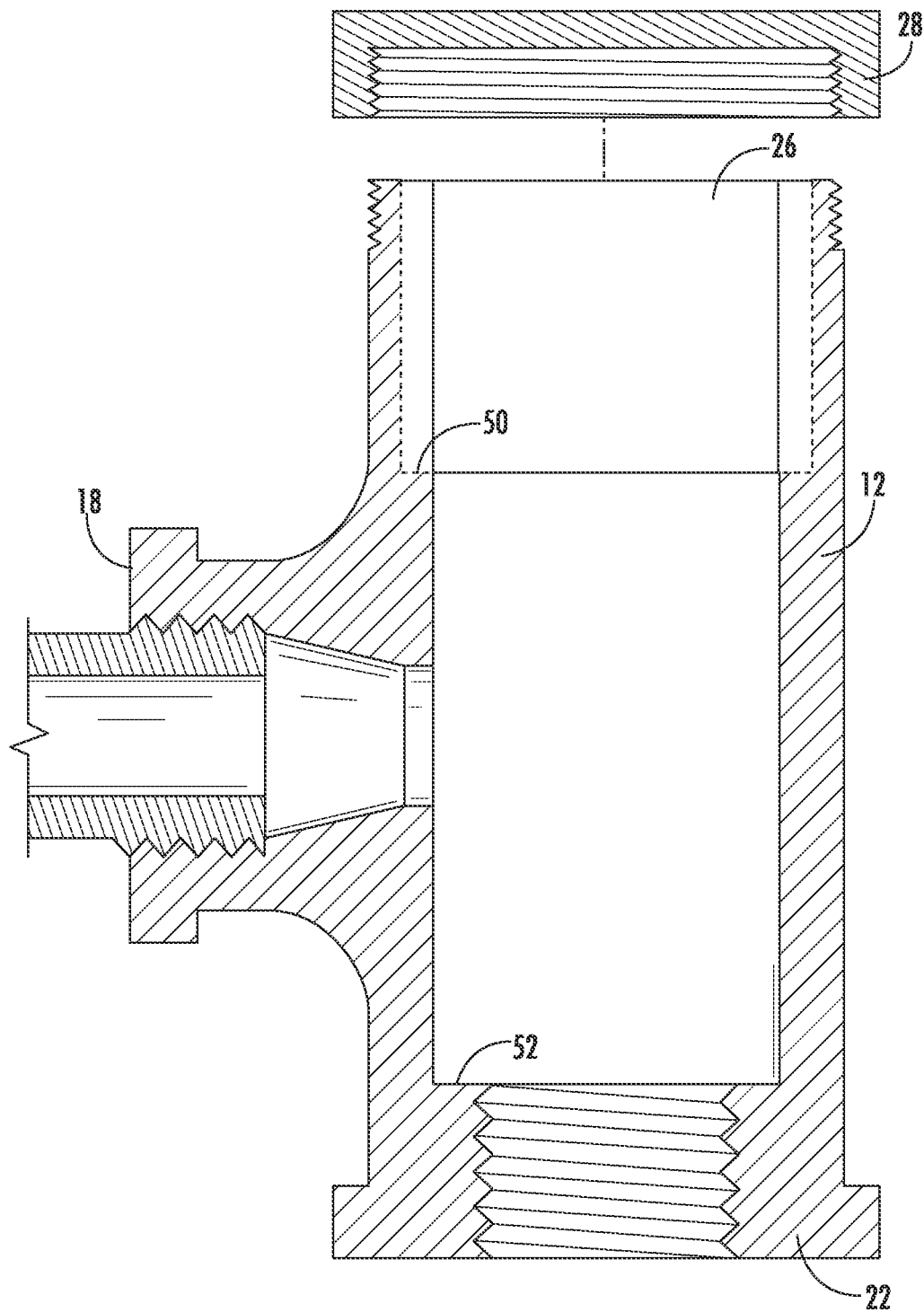
FIG. 3 is a cross-sectional view of an illustrative valve body of the automatic terminal valve of the present invention.
Figure 4:
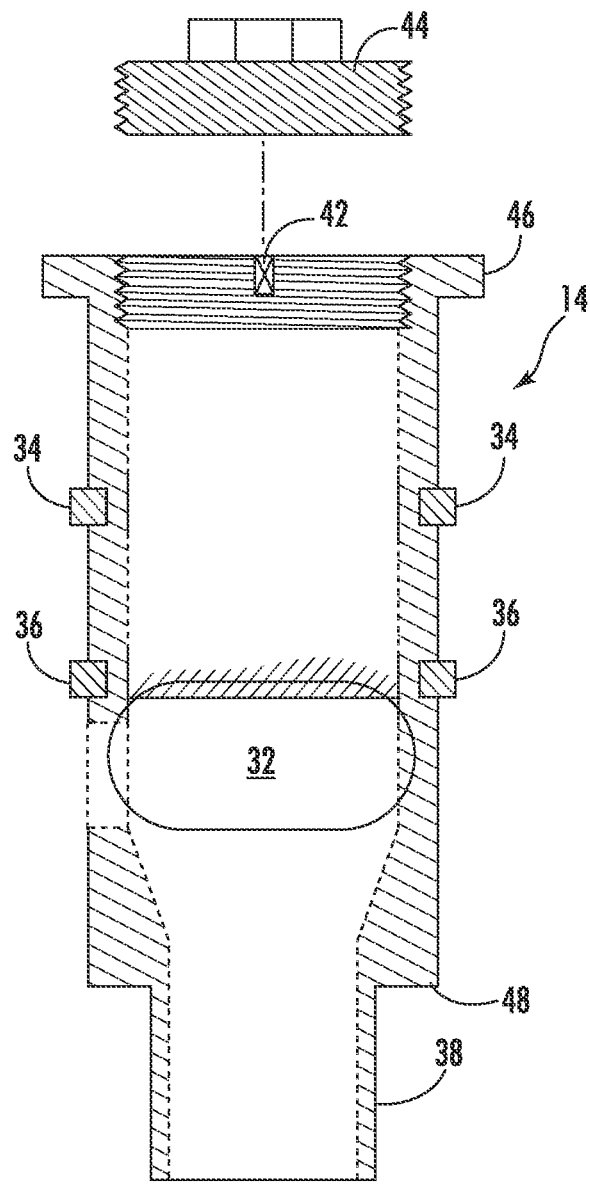
FIG. 4 is a cross-sectional view of an illustrative valve plunger of the automatic terminal valve of the present invention.

The valve plunger 14 further includes a neck 38 that extends into the sprinkler head 24 connection point 22 and is also hollow, continuing the flow path 16 as between the valve port 32 and the sprinkler head 24. The valve plunger 14 is preferably spring biased, by spring 40 such that when a feed line 20 is connected and no sprinkler head 24 is installed, as depicted in FIG. 2, the valve plunger 14 is displaced into a closed position, away from the sprinkler feed line 20 connection point 18, with the valve port 32 positioned within the valve body 12 being sealed against flow by the two sealing rings 34, 36. It is of note that sealing ring 36 prevents flow of fire protection fluid to the sprinkler head connection 22 in this position allowing removal and replacement of the sprinkler head 24. Sealing ring 34 further prevents flow of fire protection fluid into the operable portion of the valve body 12. In this manner sealing ring 34 ensures that the operable space in the valve body 12 behind the valve plunger 14 remains filled with air rather than fluid as fluid in this location would become trapped. Since air is compressible and fluid is not air allows easier operation of the valve plunger wherein it can be compressed while fluid in this location interferes with operation of the valve plunger 14 within the valve body 12. More specifically, should water get into the body behind the valve plunger, installation of the sprinkler head requires that sufficient pressure be exerted against the valve plunger to displace the incompressible water from this space. By sealing the space and maintaining the air gap, the valve plunger only has to compress the trapped air rather than displace the water as the sprinkler head is installed.

As shown in FIG. 2, when a sprinkler head 24 is installed into the sprinkler connection point 22 within the valve body 12, the valve plunger 14 is pressed into the valve body 12 by the sprinkler head 24 as it is threaded into the sprinkler head connection point 22. It can be seen that the sprinkler head 24 comes into contact with the neck 38 on the valve plunger 14, thus displacing the valve plunger 14 against the spring pressure. When fully installed, the sprinkler head 24 depresses the valve plunger 14 thereby positioning the valve port 32 into alignment with the feed line 20. In this position, fire protection fluid is freely allowed to flow through flow path 16 from the feed line 20 to the sprinkler head 24.

Further, the valve plunger 14 is preferably indexed within the valve body using an indexing pin, fin or the like 42, that aligns with a provision within the valve body 12 in a manner that prevents rotation as between the two components. A removable cap 28 may be provided as stated above for access into the valve body 12. Similarly, a removable cap 44 may be provided on the valve plunger 14 to allow access and servicing as needed. Shoulders 46, 48, may optionally be provided at one or both ends of the valve plunger 14 that cooperate with stops 50, 52 within the valve body to limit the overall travel distance of the valve plunger 14 within the valve body 12 and facilitate alignment of the valve port 32 reliably in the correct closed position.

While the present disclosure has been illustrated in an embodiment that fully describes operation and use within a fire protection system, one skilled in the art should appreciate that by connecting the valve to any fluid or supply system via connection port 18 to any fluid or air supply feed line 20 and then installing an outlet pipe into the opposing connection port 22 would allow installation and use of the present valve in any fluid supply system whether it be air or another fluidized agent. In all other aspects the operation of the automated valve would be the same as fully disclosed above wherein removal of the outlet connection would cause closure of the automated valve and installation of the outlet connection would cause the automated valve to open.

It can therefore be seen that the present disclosure provides an automated valve at the terminal end of a fire protection drop that eliminates the need to drain and recharge a fire protection system with fire retardant fluid whenever a sprinkler head must be serviced. Further it can be seen that an economical and effective solution for the problem of having to drain and recharge the fire protection system without introducing manual valves that are not permitted in such systems is disclosed. Still further, the present disclosure provides an economical and effective solution for the problem of having to drain and recharge the fire protection system when servicing sprinkler heads that does not require any significant change in layout or dimensions of the fire protection sprinkler system while also preventing the introduction of manual valves that would compromise the failsafe operation of the system. For these reasons, the present disclosure is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A self-closing sprinkler fire protection valve assembly, comprising:
   a valve body having a first connection port installed into a fire protection fluid supply line and a second connection port with a hollow cavity extending between said first and second connection ports;
   a valve plunger slidably received within said hollow cavity, said valve plunger including a valve port proximate said first connection port and a neck positioned within said second connection port, said valve plunger having a flow channel extending between said valve port and said neck and a shoulder to retain said valve plunger within said valve body at an end opposite said neck; and
   first and second seals positioned about said valve plunger to engage an inner wall of said hollow cavity within said valve body;
   wherein said valve port has a normally closed position preventing fire protection fluid flow between said first and second connection ports and an open position when a sprinkler head connection is made to said second connection port, said second seal preventing fluid flow into said operable space in said valve body behind said valve plunger in said open and closed positions, when said connection is made to said second connection port said valve plunger is displaced and retained by said connection in a manner that aligns said valve port with said first connection port thereby allowing fire protection fluid flow through said flow channel.

2. The self-closing valve assembly of claim 1, wherein said first and second connection ports are threaded.

3. The self-closing valve assembly of claim 1, wherein said first and second connection ports are slip fit.

4. The self-closing valve assembly of claim 1, wherein one of said first and second connection ports is threaded and the other is slip fit.

5. The self-closing valve assembly of claim 1, further comprising:
   a spring positioned within said hollow cavity, said spring applying spring tension causing said valve plunger to slide to said normally closed position.

6. The self-closing valve assembly of claim 1, said first and second seals positioned about said valve plunger further comprising:
   said second seal positioned between said first connection port and said hollow cavity when said valve plunger is in said normally closed position to prevent fluid flow into said hollow cavity; and
   said first seal positioned between said first connection port and said flow channel when said valve plunger is in said normally closed position to prevent fluid flow into said flow channel.

7. The self-closing valve assembly of claim 1, wherein said first connection port is connected to a fluid supply line and said second connection port is connected to a fluid outlet line.

8. The self-closing valve assembly of claim 1, wherein said valve body is formed from a material selected from the group consisting of: brass, cast iron, galvanized iron, galvanized steel, ductile iron, copper and CPVC.

9. The self-closing valve assembly of claim 1, wherein said valve plunger is formed from a material selected from the group consisting of: brass, cast iron, galvanized iron, galvanized steel, ductile iron, copper and CPVC.

* * * * *